Patented Aug. 16, 1949

2,479,068

UNITED STATES PATENT OFFICE 2,479,068

PREPARATION OF UNSATURATED ETHERS

William F. Gresham, Wilmington, Del., assignor to E. I. du Pont de Nemours & Company, Wilmington, Del., a corporation of Delaware No Drawing. Application June 5, 1947, Serial No. 752,845

11 Claims. (Cl. 260—615)

This invention relates to the synthesis of 1,2-dialkoxyethylenes, and more particularly a method for the preparation of 1,2-dimethoxyethylene, which is a novel composition of matter.

In the copending application of W. F. Gresham and R. E. Brooks, S. N. 680,072, filed June 28, 1946, now Patent No. 2,449,470, it is disclosed that 1,1,2-trialkoxyethanes can be prepared by reacting a dialkyl formal with carbon monoxide and hydrogen in the presence of an alkanol at a temperature within the range of 100° to 350° C. under a pressure of at least 10 atmospheres in the presence of a nickel-containing or cobalt-containing catalyst.

An object of the present invention is to prepare 1,2-dialkoxyethylenes. Another object of the invention is to provide a process for preparing 1,2-dialkoxyethylenes from the 1,1,2-trialkoxyethanes which may be prepared as disclosed in the said copending application, S. N. 680,072. Other objects of the invention will appear hereinafter.

It has been discovered in accordance with this invention that 1,2-dialkoxyethylenes can be prepared by pyrolysis of 1,1,2-trialkoxyethanes. For example, it has been discovered that 1,2-dimethoxyethylene can be prepared in excellent yield by heating 1,1,2-trimethoxyethane at elevated temperature, whereby demethanolation occurs, preferably in the presence of a catalyst, as hereinafter described. Moreover, 1,1,2-trialkoxyethanes containing inert substituents can also be pyrolyzed in a similar manner; e. g., the pyrolysis of $CH_3OCH_2CHOCH_3CH(OCH_3)_2$ yields a mixture of $CH_3OCH_2COCH_3=CHOCH_3+CH_3OH$.

The 1,1,2-trialkoxyethanes which may be employed in the practice of this invention include 1,1,2 - trimethoxyethane, 1,1,2 - triethoxyethane, 1,1,2-tributoxyethane, etc. The pyrolysis of these substances to the corresponding dialkoxyethylene takes place preferably, but not necessarily, in the vapor phase. Good results are obtained in vapor phase operation at a temperature within the range of about 300° to 450° C., preferably about 350 to 375° C. Much lower temperatures may be employed, however, especially when the pyrolysis of the 1,1,2-trialkoxyethane is carried out in the liquid phase, e. g. in the presence of a sodium alkoxide catalyst. Numerous solid absorptive substances are highly effective as catalysts in the liquid or vapor phase processes. In general, any solid absorptive substance is effective, and catalysts which are useful in vapor phase dehydration reactions are especially suitable. These catalysts may be either acidic or alkaline, in specific embodiments. An outstanding catalyst is barium hydroxide-silica gel, which may be prepared by impregnating silica gel with aqueous barium hydroxide solution and thereafter removing the water from the resulting mixture. Other effective catalysts include boron phosphate, aluminum oxide, titania gel, aluminum phosphate, silica gel, alkali metal carbonate-silica gel and acidic clay-like materials of the kind commonly employed in cracking petroleum. The catalyst is employed preferably in granular form but may also be employed in the form of a very finely divided solid, which, in certain embodiments, may be suspended in the reaction vessel in the manner commonly used in processes employing the "fluidized solid catalyst" technique.

The invention is illustrated further by means of the following examples.

*Example 1.*—1,1,2-trimethoxyethane vapor was passed over a barium hydroxide-silica gel catalyst at a space velocity of 200 at a temperature of about 350° C. The resulting product was condensed and thereafter distilled through an efficient fractionating column. After removal of a methanol-dimethoxyethylene azeotrope the distillation temperature rose rapidly to 93° C. The main fraction boiled at 93° to 103° C. The conversion of 1,1,2-trimethoxyethane to crude dimethoxyethylene was 77.4%, and the yield, based on the quantity of 1,1,2-trimethoxyethane consumed was 88.4%. The dimethoxyethylene-methanol azeotrope, boiling at 63° to 64° C. was found to have the composition 10% dimethoxyethylene and 90% methanol. Careful fractionation of the main fraction boiling at 93° to 103° C. resulted in pure 1,2-dimethoxyethylene boiling at 102° with a refractive index of 1.4190 at 25° C. (D line). 1,2-Dimethoxyethylene was identified by hydrogenation to 1,2 - dimethoxyethane with Raney nickel catalyst at 70° to 80° C. During the purification by careful distillation (to separate the cis and trans isomers), material boiling at 97° to 98.5°, refractive index 1.4121 at 25° (D line), was collected which evidently contained a predominating amount of one of the isomers. The 102° C. boiling dimethoxyethylene evidently was the other stereoisomer.

*Example 2.*—1,1,2-trimethoxyethane was vaporized and passed over a $Na_2B_4O_7$-on-silica gel catalyst maintained at a temperature of 410° to 490° C. (space velocity, 394). The condensed effluent was distilled. A small amount of methanol was recovered and a mixture boiling from 70° to 123° C. (B. P., dimethoxyethylene, 97° to 102° C.) was obtained.

*Example 3.*—A run similar to the one described in Example 2 was carried out at a temperature of ca. 500° to 600° C. at a space velocity of 1200. Most of the 1,1,2-trimethoxyethane was converted to gaseous products, less than half of the starting material being converted to liquid product boiling over the range of 39° to 125° C. It was noted that the rate of permanent gas formation increased rapidly as the temperature was raised from 500° to 600° C.

*Example 4.*—A mixture containing 1,1,2-trimethoxyethane (0.375 mol) and methylal-methanol azeotrope (1.5 mols methylal) was passed over a silica gel catalyst at a temperature of 380° to 412° C., the space velocity of the trimethoxyethane being 281 and the space velocity of the methylal being 1120. The resulting product was condensed and redistilled, yielding a methylal-methanol fraction (weight 125.5 grams, B. P. 39° to 64° C. at atmospheric pressure) and a higher boiling fraction (B. P. 41.5° to 69° at 113 mm. to 120 mm.) which was largely 1,2-dimethoxyethylene. The conversion to dimethoxyethylene based upon the quantity of trimethoxyethane charged was 70%, and the yield of dimethoxyethylene based on the weight of trimethoxyethane consumed, as estimated from the quantity of trimethoxyethane in the highest boiling fraction, was about 90%. The distillate which was collected at 51° to 55° C., under a pressure of 113 mm. to 120 mm., had a refractive index of 1.4128 at 25° C. (methoxyl content 69.2, 68.6%; calc. 70.4% for $CH_3OCH=CHOCH_3$).

*Example 5.*—A mixture containing 22.5 grams 1,1,2-trimethoxyethane and 2 grams of finely powdered acid-washed clay catalyst (of the kind employed commercially in the refining and cracking of petroleum), was heated at the boiling point in an apparatus equipped with a reflux condenser. The boiling was continued at atmospheric pressure for one hour, a methanol distillate being removed overhead. The resulting product was rapidly distilled from the catalyst at reduced pressure, and the distillates were then recombined and redistilled, yielding 2.3 grams methanol, 1.2 grams 1,2-dimethoxyethylene (B. P. 51° to 60° C. at 107 mm.), 6.7 grams recovered trimethoxyethane, and 3.7 grams of higher boiling material. With 1,1,2-triethoxyethane as the starting material, a similar result is obtained, the pyrolysis product being 1,2-diethoxyethylene.

The dimethoxyethylene obtained as above described was quite stable to heat, and was not rapidly polymerized by heating at a temperature of 100° C. in the presence of benzoyl peroxide catalyst. It was converted to a solid polymer, however, at a temperature of −20° C., in the presence of anhydrous boron trifluoride.

The above examples are illustrative only and numerous embodiments of the invention will occur to those who are skilled in the art. For example, while it is preferred to employ relatively low molecular weight trialkoxyethanes in the practice of the invention, the higher molecular weight trialkoxyethanes may also be employed, although they tend to decompose to aldehydic substances at the elevated temperatures required for rapid pyrolysis. Inert diluent gases may be employed to assist the conversion of the trialkoxyethanes to dialkoxyethylenes, but the use of these diluents is generally not necessary. The pyrolysis can be conducted at any convenient pressure. Pressures higher than atmospheric pressure are generally neither desirable nor necessary, best results being obtained at about atmospheric pressures or at pressures only slightly above atmospheric pressure. Excellent results are also obtained at subatmospheric pressures, but, in general, the use of pressures below atmospheric pressure is not necessary.

The term "space velocity" is used herein with the meaning which has been widely accepted for many years, i. e. it is the volume of gas (corrected to 0° C., 760 mm. pressure) which is passed over one unit volume of catalyst per hour.

The products obtained in accordance with this invention are useful as intermediates for the manufacture of numerous organic compounds, such as glycerin, unsaturated esters, glycol ethers, etc. They are also useful in the manufacture of resinous materials, including polymers and interpolymers. Interpolymers of 1,2-dimethoxyethylene with vinyl compounds, dienes, etc., can be prepared, for example. These polymers and interpolymers are valuable as components of coating compositions, molded products, etc.

Since many embodiments of the invention may be made without departing from the spirit and scope thereof, it will be understood that I do not limit myself except as set forth in the following claims.

I claim:

1. 1,2-dimethoxyethylene.

2. The isomeric form of 1,2-dimethoxyethylene having a boiling point of 102° C. at atmospheric pressure, and a refractive index of 1.4190 at 25° C.

3. The isomeric form of 1,2-dimethoxyethylene having a boiling point of 97° to 98.5° C. at atmospheric pressure, and a refractive index of 1.4121 at 25° C.

4. A process for preparing 1,2-dialkoxyethylenes which comprises heating in the vapor phase 1,1,2-trialkoxyethanes at a temperature within the range of 300° to 450° C. whereby pyrolysis of the 1,1,2-trialkoxyethane to 1,2-dialkoxyethylene takes place, and thereafter separating the 1,2-dialkoxyethylene from the resulting mixture.

5. A process for preparing 1,2-dimethoxyethylene which comprises heating 1,1,2-trimethoxyethane in the vapor phase at a temperature within the range of 300° to 450° C., in the presence of a barium hydroxide-silica gel catalyst, whereby pyrolysis of 1,1,2-trimethoxyethane to 1,2-dimethoxyethylene takes place, and thereafter separating 1,2-dimethoxyethylene from the resulting product.

6. A process for preparing 1,2-dimethoxyethylene which comprises heating in the vapor phase 1,1,2-trimethoxyethane, in the presence of a barium hydroxide-silica gel catalyst, at a temperature within the range of 350 to 375° C. whereby 1,2-dimethoxyethylene is formed, and thereafter separating 1,2-dimethoxyethylene from the resulting mixture.

7. A process for preparing a 1,2-dialkoxyethylene which comprises pyrolyzing a 1,1,2-trialkoxyethane in the presence of a solid contact absorptive catalyst at a temperature within the range of 300° to 450° C. and thereafter separating 1,2-dialkoxyethylene from the resulting mixture.

8. A process for preparing 1,2-dimethoxyethylene which comprises heating at demethanolation temperature within the range of 300° to 450° C. 1,1,2-trimethoxyethane in the presence of a solid contact absorptive catalyst and thereafter separating 1,2-dimethoxyethylene from the resulting mixture.

9. The process of claim 8 in which the solid absorptive catalyst is silica gel impregnated with $Ba(OH)_2$.

10. The process of claim 8 in which the solid absorptive catalyst is silica gel impregnated with $Na_2B_4O_7$.

11. The process of claim 8 in which the said catalyst contains silica gel.

WILLIAM F. GRESHAM.

REFERENCES CITED

The following references are of record in the file of this patent:

UNITED STATES PATENTS

| Number | Name | Date |
|---|---|---|
| 2,426,863 | Deebel | Sept. 2, 1947 |